J. W. TYGARD.
INTERNAL PROGRESSIVE COMBUSTION ROTARY MOTOR.
APPLICATION FILED FEB. 26, 1901.
1,060,039.
Patented Apr. 29, 1913.
7 SHEETS—SHEET 1.
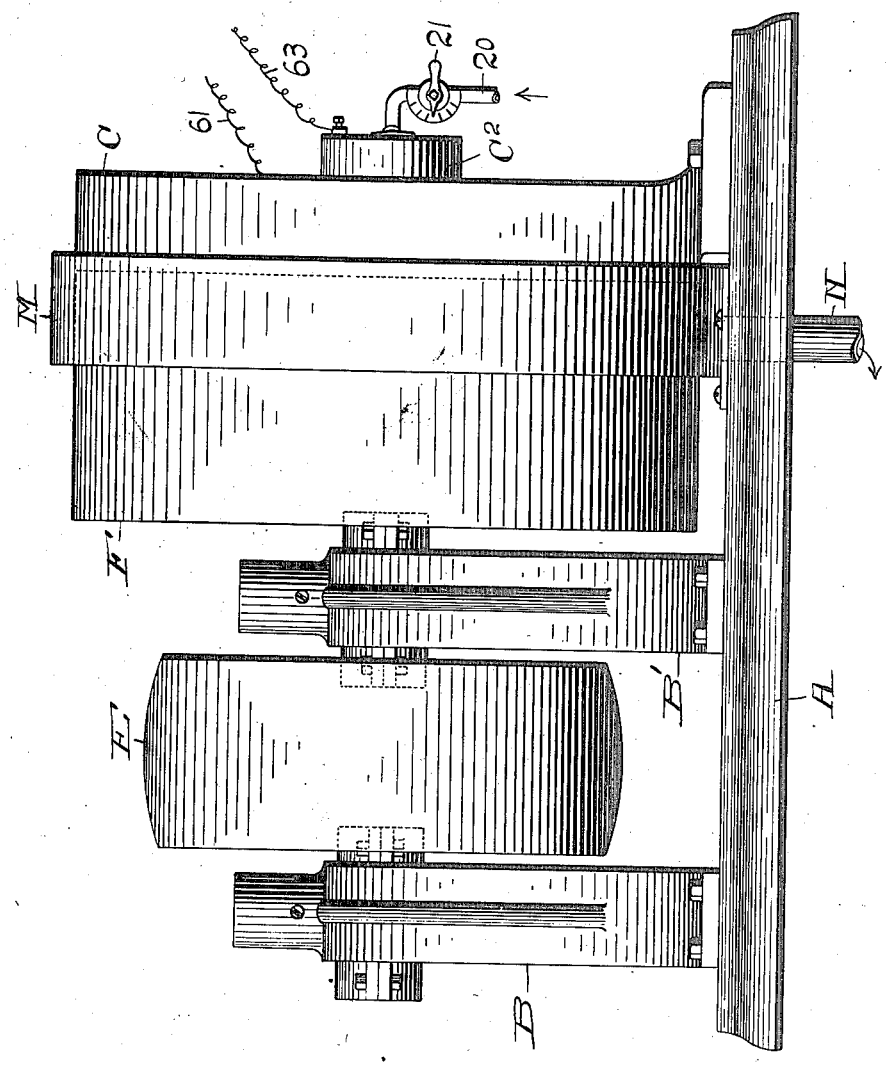

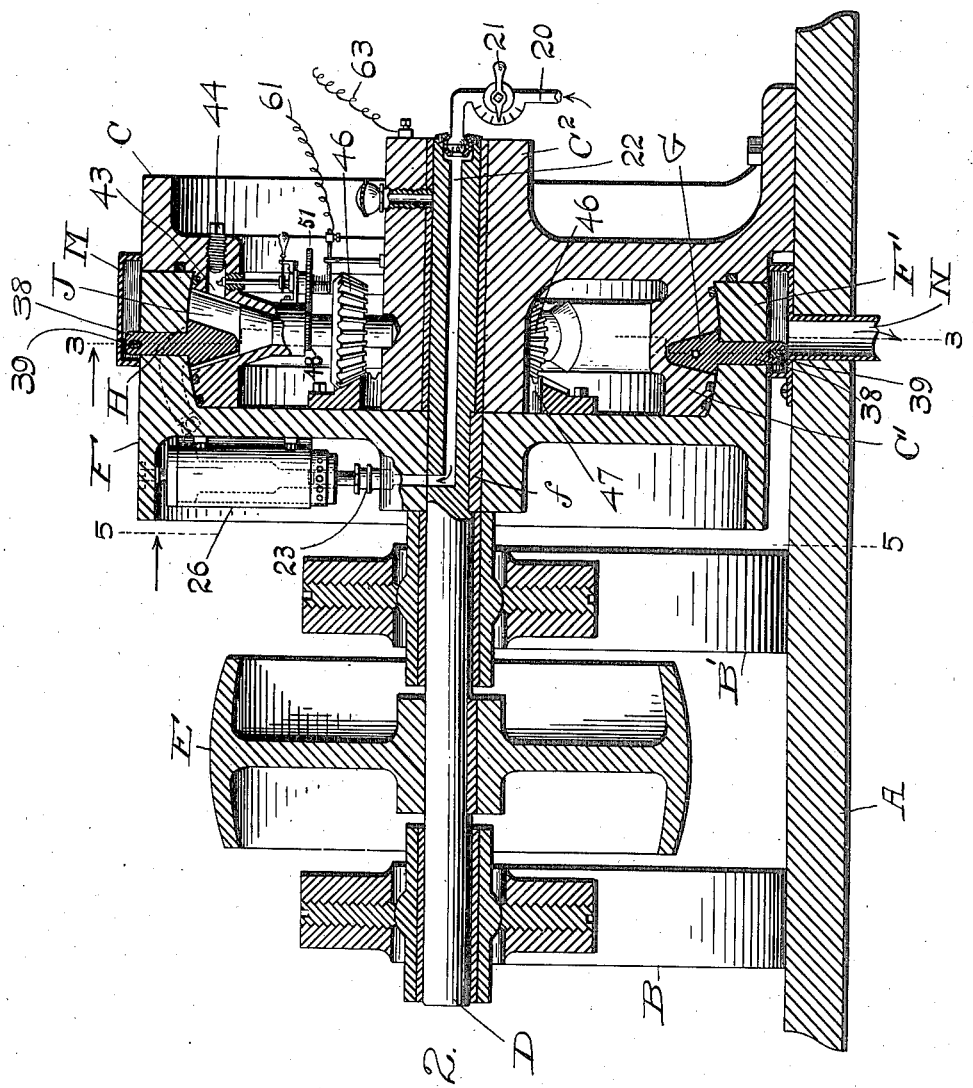

J. W. TYGARD.
INTERNAL PROGRESSIVE COMBUSTION ROTARY MOTOR.
APPLICATION FILED FEB. 26, 1901.
1,060,039.
Patented Apr. 29, 1913.
7 SHEETS—SHEET 3.
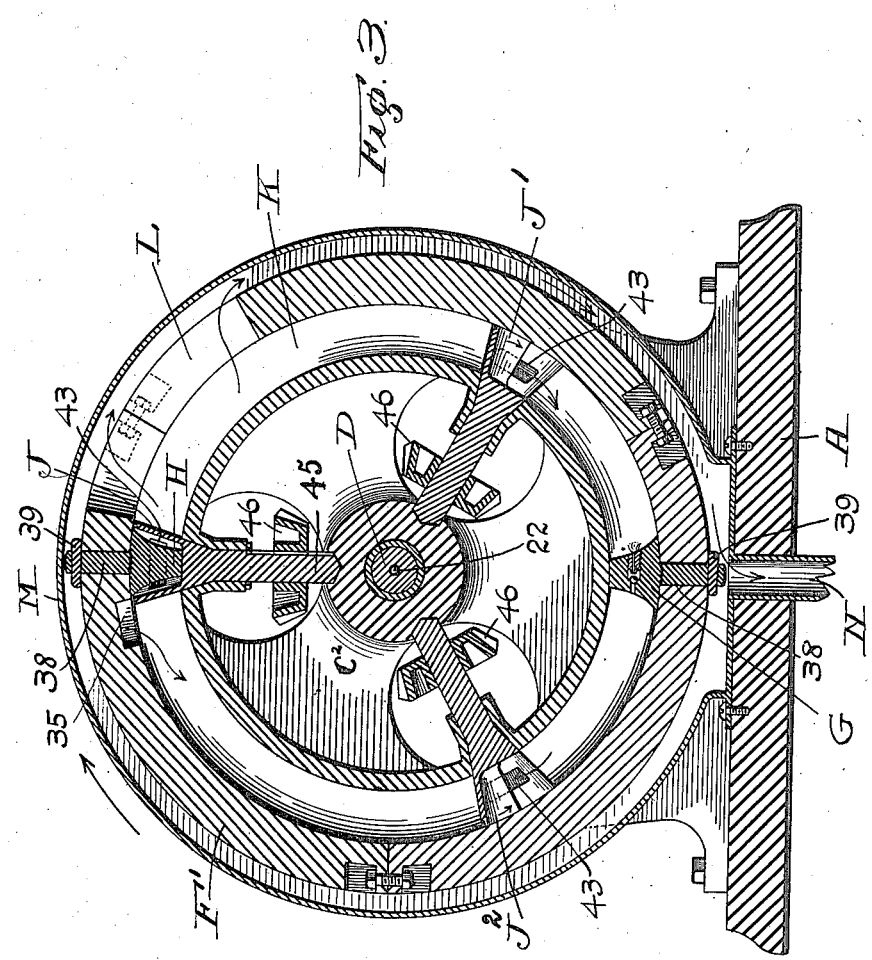
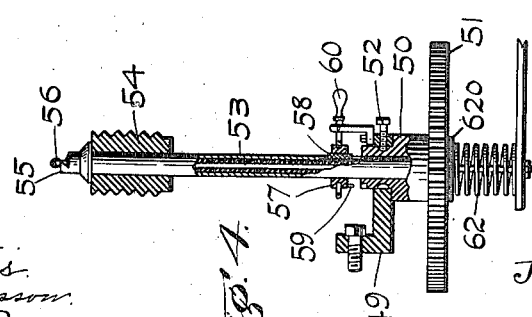

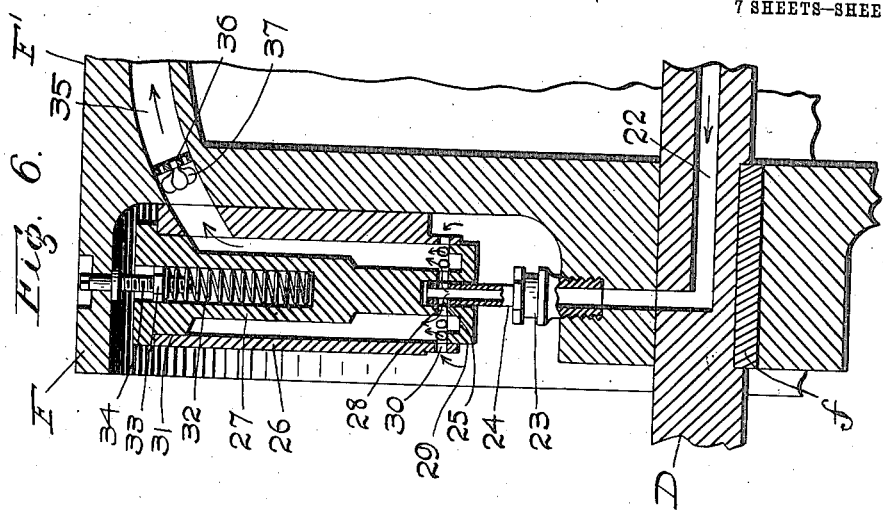
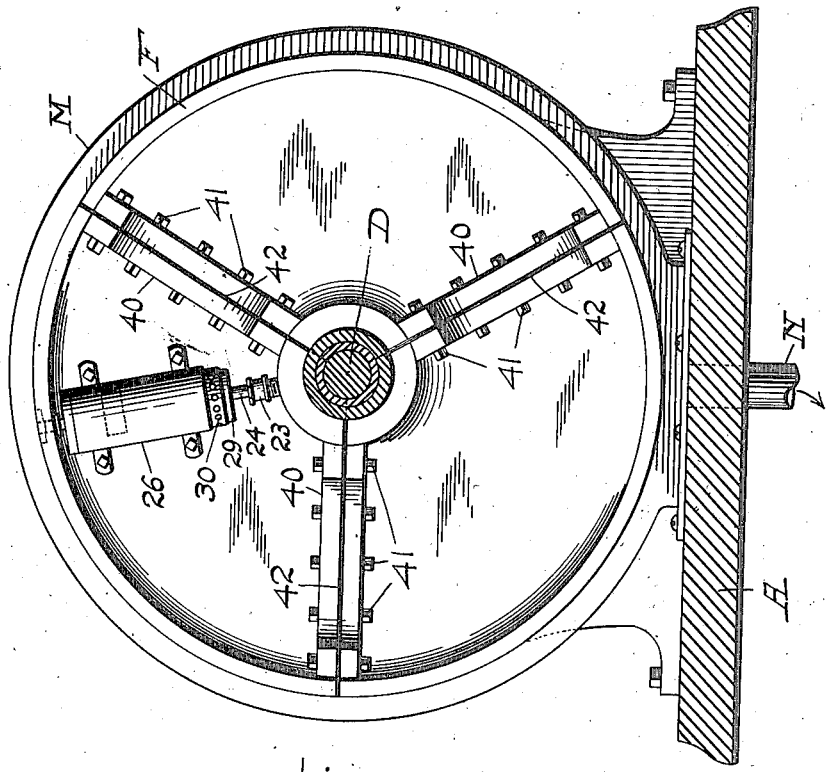

J. W. TYGARD.
INTERNAL PROGRESSIVE COMBUSTION ROTARY MOTOR.
APPLICATION FILED FEB. 26, 1901.
1,060,039.
Patented Apr. 29, 1913.
7 SHEETS—SHEET 5.
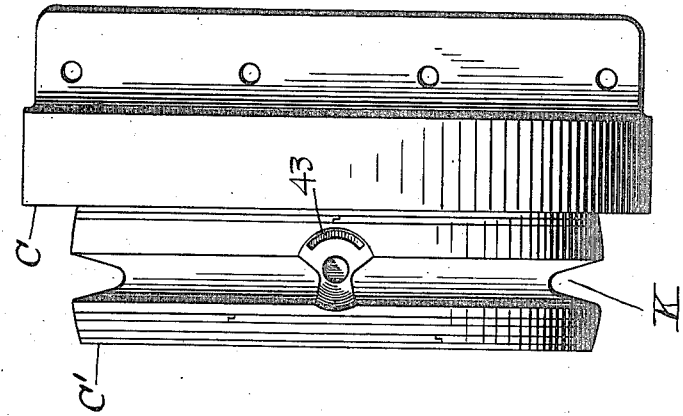
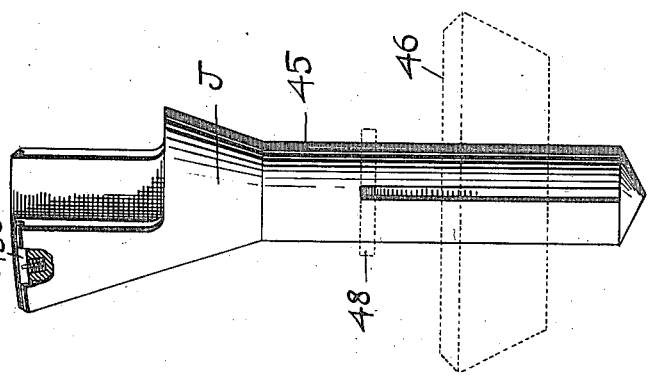
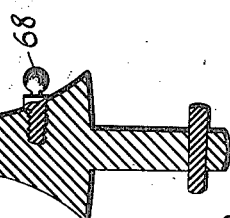
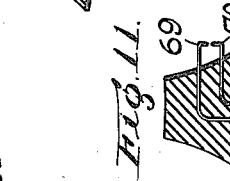
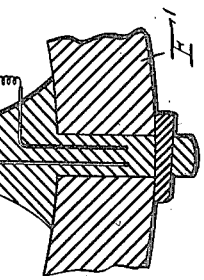
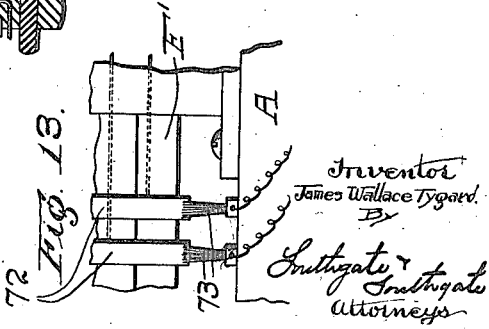

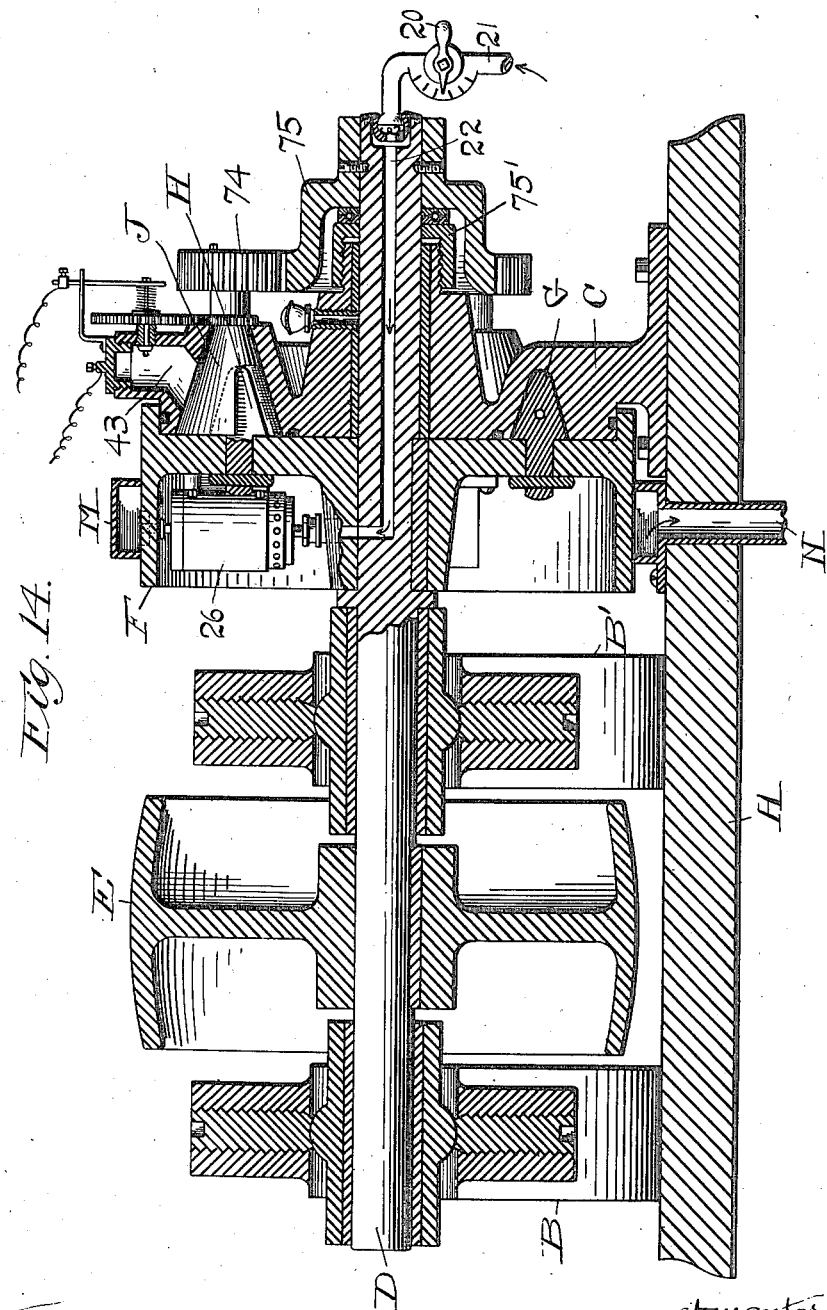

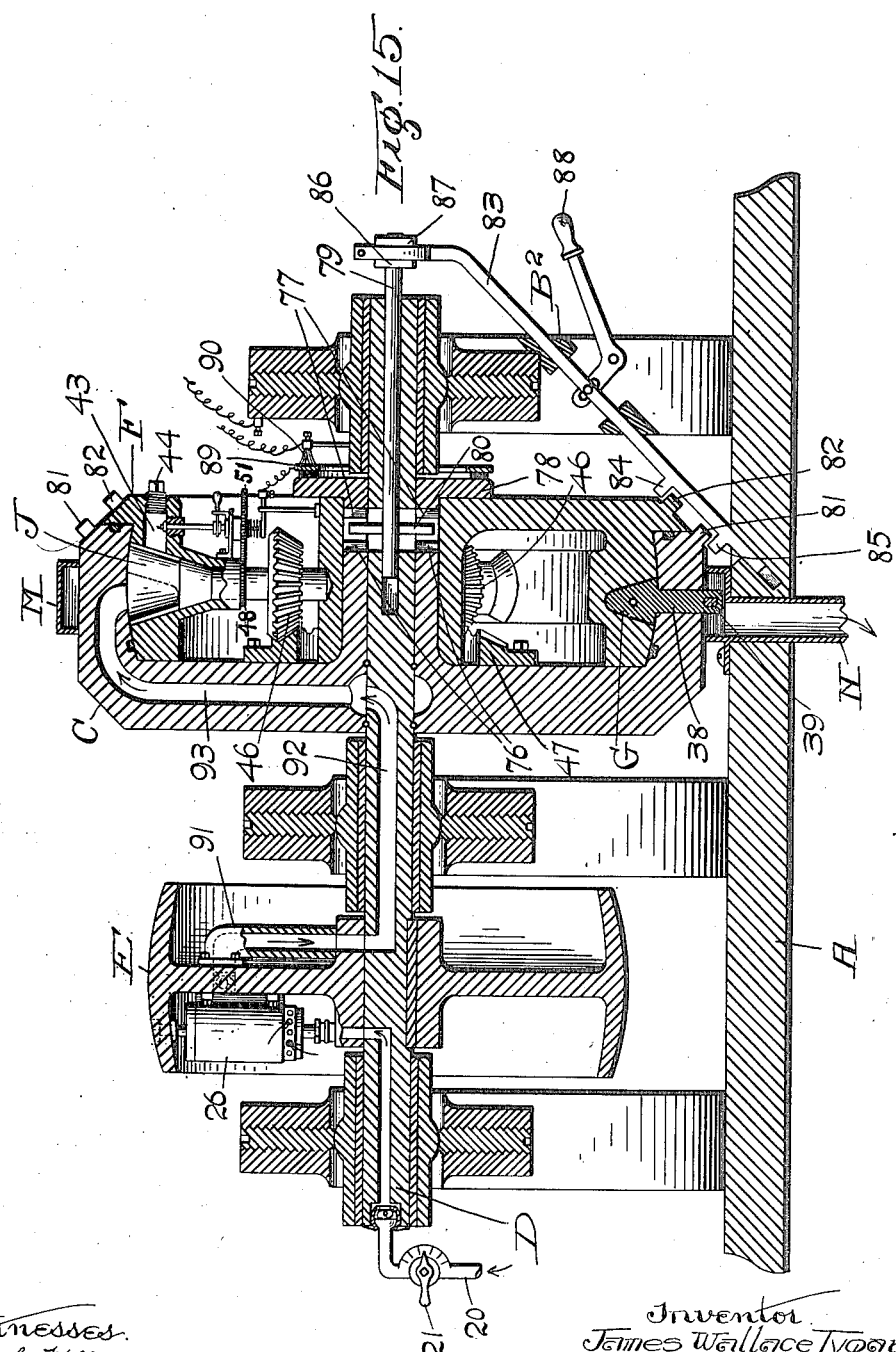

UNITED STATES PATENT OFFICE.

JAMES WALLACE TYGARD, OF NEW YORK, N. Y., ASSIGNOR OF ONE-THIRD TO HENRY A. WISE WOOD, OF NEW YORK, N. Y., AND TWO-THIRDS TO THE TYGARD ENGINE, A CORPORATION OF NEW JERSEY.

INTERNAL-PROGRESSIVE-COMBUSTION ROTARY MOTOR.

1,060,039.  Specification of Letters Patent.  Patented Apr. 29, 1913.

Application filed February 26, 1901. Serial No. 48,935.

*To all whom it may concern:*

Be it known that I, JAMES WALLACE TYGARD, a citizen of the United States, residing at New York, in the county of New York and State of New York, have invented a new and useful Internal-Progressive-Combustion Rotary Motor, of which the following is a specification.

The primary object of this invention is to provide a new and improved combustion motor employing an explosive fluid as the actuating medium, in which the functions or divisions of operation, commonly called introduction, compression, explosion and expansion, and exhaust, necessary to the complete operation shall be performed by a system in which each function or division of operation takes place continuously, coördinately, and in proper relative successive sequence, in contradistinction to the cyclical or step by step method ordinarily employed in such motors.

The invention consists in a mechanism or machine constructed and adapted so that all the above mentioned functions or divisions of operation are performed in a single continuous annular chamber or cylindrical groove by means of pistons and revolving valves intersecting said groove, which permit the pistons to pass, but which divide the groove into compartments, and which are arranged to allow a continuous forward piston movement, similar to the forward piston movement under the pressure of explosion and expansion in a straight cylindrical chamber, without the necessity of backward motion or change of function on any piston face, and without the speed limitations of reciprocating parts. That is, the valves and ports are arranged so that each division of operation takes place progressively around the annular groove with the pistons, and successively in its proper sequence in each compartment formed by the valves between which it occurs, whereby each face of each piston is continuously employed in performing the same function, and whereby the four divisions constituting a complete operation take place successively in proper order in each compartment. By this construction, for example, if two pistons are used, one piston may be arranged to constitute what is hereinafter termed the propelling piston, that is, it will receive the impact or pressure of the explosion and expansion on its rear face, and will perform the function of compression with its front face. This propelling piston will be subjected to the expansive effect of a fresh charge every time it passes a valve so that there will be substantially a constant torque. As the rear face of this propelling piston continually receives the impact of the successive explosions and expansions, a simple ignition device can be used, which can be carried by said face. This ignition device preferably consists of a small hole bored through the piston, which will allow a small flow of the actuating medium therethrough from the compression side of the piston, thus maintaining a small flame in proper position to ignite each compressed charge. If two pistons are used, the other piston, termed the charging piston, is arranged to have its front face continually perform the function of exhaust, and its rear face the function of introduction. The annular groove or chamber is preferably divided into more compartments than there are pistons. For example, if two pistons are used, the chamber may be divided into three compartments by three valves. The inlet and exhaust ports are preferably arranged to travel with the pistons. The exhaust port is given considerable lead, which in connection with the extra compartment, effects a cooling function. That is to say, so soon as the propelling piston passes out of a particular compartment, the exhaust port immediately comes therein to allow the prompt exhaust of the spent charge, and as the exhaust takes place by the traverse of the charging piston, a fresh charge is drawn into said compartment by the rear face of said piston. This fresh cool charge will stay momentarily in this compartment before compression, or until the propelling piston enters therein for this purpose. This momentary dwell will give the fresh cool charge an opportunity to take back a certain amount of heat absorbed by the walls of this compartment from the previous explosion therein. Thus the walls of the motor will be kept cool, and in most instances water-jacketing is not necessary. Each fresh charge is compressed in one compartment, and passes forward through the valve dividing this compartment into a small compression chamber at the side of said valve, and is exploded, expanded in, and exhausted from the adjoining compartment, which is in advance of the compartment in which the charge was introduced.

The terms "front" and "back" referring to the piston faces, and the terms "advance," etc., are used relatively to the rotative movements of the parts.

Instead of having the pistons travel, the pistons may be stationary, and the part which carries the valves may be made to revolve around the pistons. In this way a reversible motor may be provided.

The invention further consists of certain important details of construction hereinafter described, in connection with the drawings.

Accompanying this application are seven sheets of drawings, which form part of this specification.

Referring to said drawings and in detail, Figure 1 is a side elevation of the motor, Fig. 2 is a central longitudinal section thereof, Fig. 3 is a cross sectional view taken on the line 3—3 of Fig. 2, Fig. 4 is an enlarged detail view of a part termed the initial ignition device, Fig. 5 is a cross sectional view taken on the line 5—5 of Fig. 2, Fig. 6 is an enlarged sectional view of the governor, Fig. 7 is an enlarged elevation of one of the valves, Fig. 8 is a top plan view of the member which has the annular groove cut therein, and which carries the valves, Fig. 9 is an enlarged sectional view of the propelling piston, Figs. 10, 11 and 12 are similar views illustrating modifications, Fig. 13 is a view illustrating the electrical connections used with the devices shown in Figs. 11 and 12, and Figs. 14 and 15 are views similar to Fig. 2, illustrating modifications hereinafter described.

In detail, A designates a suitable base-piece or frame, secured to which are the bearings B and B'.

C designates a member, which in the present instance, has a foot-piece secured to the base A. This member is also shaped to constitute a bearing C², in which, and in the bearings B and B', is journaled a shaft D, which carries a pulley E. Either or both bearings B—B' and the pulley may be omitted if desired, and the motor coupled up in any desired manner, the bearings and pulley shown serving as the illustration of a use of my motor when the same is to be utilized to transmit power by means of a belt. The member C has an extending flange C', in which is cut the annular groove K which forms the working channel of the motor.

F designates the piston carrying member, and the same is rigidly secured to the shaft D by means of a key f. This piston carrying member is provided with a flange F' which fits over the flange C' of the member C. The bearing faces between the flanges F' and C' are made to form substantially the surface of a sphere, for a purpose hereinafter described. Secured in this flange F' at 180° from each other, or diametrically opposite, are two pistons G and H, the first of which will be hereinafter termed the propelling piston G, and the other the charging piston H. The annular groove is divided by a number of valves into a number of compartments. In the present instance, three such valves J, J' and J² are shown, so that there will be three compartments. This arrangement is preferred when two pistons are used. The valves are preferably offset to one side of the groove K, as shown, so that the pistons can properly pass the same. An exhaust port L is cut through the flange F', as shown in Fig. 3.

The supply of actuating medium is taken to the motor by means of an inlet pipe 20, which has a graduated hand-valve 21. The pipe 20 is coupled to the shaft D by any of the usual means, as by a ball-and-socket joint-bearing, as shown. A hole 22 is bored part way through the shaft D, so as to allow the supply to pass up into a nipple 23 screwed into the hub of the member F, as shown more particularly in Fig. 6. From here, the supply of the explosive medium is mixed with a certain amount of air, and passes through a governor which may be constructed as follows: 24 designates a tube which is secured in the nipple 23, and which has a number of lateral holes 25. 26 designates a casing which is secured to the member F. Fitting in this casing is a governor or valve 27, which has a number of holes 28 matching the holes in the tube. The governor-valve also has a flange 29 at its lower end, and a number of holes 30 are bored in the lower end of the casing 26 to match the holes 25 and 28. The governor-valve 27 fits tightly in the casing 26 at its upper end 31, and is made hollow to receive a spring 32, as shown. Resting on top of the spring 32 is a nut 33, which is fitted to slide up and down in the hole in the governor-valve, but so that it cannot turn therein. A screw 34 is threaded into this nut, and projects up through the periphery of the member F, as shown.

A suitable inlet passage or port 35 leads from the governor casing in behind the propelling piston G. This device forms a suitable mixing and governing device. As the supply of gas or other medium is drawn in through the governor, a certain amount of air will be drawn or sucked in therewith through the holes 30, so that the charge at 13 this point will be mixed with the proper amount of air. As the motor attains its proper speed, the valve 27 will move radially under the action of centrifugal force, and will cut off or regulate both the supply of air and gas, and will thus properly govern the speed of the motor. By adjusting the screw 34, a proper action of the governor can be obtained, and the motor set to run at any desired speed within the proper limits. A partition 36 is arranged in the inlet passage or port 35, and is provided with a number of holes. A butterfly mixer 37, consisting of a small propeller or fan-shaped wheel, is journaled on a stud fixed in the center of this partition, the function of this part being to thoroughly mix the air and gas together as they are drawn in through the inlet port 35.

The pistons G and H are secured in the flange F' of the member F by having shanks 38 which project therethrough, and are held in place therein by keys 39. The member F is made in three sections, so that it can be fitted over the flange C'. These three sections have flanges 40, as shown in Fig. 5, and the three parts constituting the member F are secured together by bolts 41. Suitable packings 42 are arranged between the flanges 40.

A small chamber 43 is formed in the flange C' near each valve. These chambers are used as compression chambers. A large adjustable screw 44 is tapped into the member C in connection with each chamber 43, so that the end thereof forms one wall or side of the particular chamber, whereby the size of these chambers may be adjusted to get the proper degree of compression. The valves are designated by the reference letters J, J' and J², and are similar in construction. Each valve consists of a hollow conical end, which is cut partly away as shown in Fig. 7. The bearing face of each valve is provided with a suitable packing 450. The ends of the valves are turned or ground to bear snugly on the flange F'. By making the bearing faces between the flanges F' and C' constitute part of the surface of a sphere, as before mentioned, it will be seen that a tight bearing is obtained between the inner faces of the flange F' and the valves, irrespective of the fact that the valves rotate or turn during the operation. Each valve is provided with a shank 45 which fits into the flange C'. Arranged on each of these shanks is a bevel-pinion 46 which engages a bevel-gear 47 secured to the member F. The relation in this gearing is such, that the valves will turn as many times for each revolution of the motor as there are pistons. In the particular instance illustrated, as there are two pistons used, the valves will turn twice for each revolution. By properly proportioning and cutting away the valves, the parts are so arranged that the pistons can travel around the annular groove K, and past the valves, without contacting therewith, as each valve will wrap or turn around each piston as it passes. The valves at the necessary times will keep the compartments separate from each other. The ends of the valve stems may be stepped in the bearing C², as shown in Figs. 9 and 3, if desired.

It is necessary to provide some kind of an initial ignition device to start the motor in operation, and such device may be arranged in one or more of the compression chambers 43. One construction that may be adopted for this initial ignition device is shown in detail in Fig. 4. On the shank 45 of the upper valve is arranged a pinion 48. Secured to the valve-casing of this valve is a bracket 49, in which is fitted the hub 50 of a gear 51 meshing with the pinion 48, a screw 52 being tapped into the bracket 49 and engaging a groove in said hub 50, whereby said gear will be held in place and be permitted to turn in said bracket. Rigidly secured in said hub 50 is a tube or hollow shaft 53 which projects up through a screw-plug 54, which is tapped into a threaded hole bored into the compression chamber 43. The top of this tube is cut to form a cam surface, which has an abrupt point. A sparking rod 56 extends up through said tube, and is tightly fitted in the upper end thereof. This sparking rod is covered with insulating material, except at its end where it is bent over the cam 55 formed at the top of the tube 53. A bushing 57 is mounted on the tube 53, and is held thereon by a suitable key 58, so that it can slide up and down on said tube, but so that it will be constrained to rotate therewith. This bushing 57 is provided with a single tooth 59, which can engage a single notch cut in the top of the hub 50 of the gear 51. A small yoked handle 60 surrounds this bushing, whereby the latter can be raised or lowered on the tube. A suitable wire 61 connects to the lower end of the sparking rod 56. The sparking rod is normally held down by means of a spring 62, which bears on an insulating washer 620. Another wire 63 connects to the member C. A source of electricity, as a battery or dynamo, is connected to the wires 61 and 63. By this arrangement a suitable sparking device is provided. When it is desired to use this device, the bushing 57 is lowered, so that the tube 53 will be rotated. As the tube turns, the bent over end of the sparking rod will run up the cam 55, and snap down from its abrupt end, thereby momentarily breaking the circuit and creating a spark. These parts are so timed, that the sparking action takes place just as the propelling piston G passes through the valve. The pinion 48 and the gear 51 may be proportioned as one to two to get this result. After the motor has been started, it is not necessary to use this device, and the same can be thrown up out of operation by the bushing. When the parts are again thrown into operation, they will be properly timed by means of the single tooth on the bushing.

As the propelling piston G has its rear face subjected to a fresh compressed charge every time it passes a valve abutment, the same can be made to carry an ignition device, and as the front face of this piston continually performs the function of compression, this ignition device can consist of a small hole 64 bored through the piston. This hole is counterbored and screw-threaded to receive a screw-plug 65, which has a small hole bored through the same, and which thus substantially forms a burner or nipple. A by-pass 66 is bored at one side of the opening through the plug, and a ball 67 is arranged in the chamber formed between the end of the screw-plug 65 and the limit of the counterboring. This ball forms a check-valve which will prevent pressure on the rear face of the piston from passing therethrough. When the ball is in its lowest position, the by-pass prevents the same from closing or stopping communication through the screw-plug. By this arrangement in the particular motor under discussion, a very simple continuous ignition device is provided.

As the rear face of the piston is continually subjected to the pressure of the expansion, and as the front face is continually used for the purpose of compression, the operation is as follows:—As the piston reaches the limit of its travel in one of the compartments, and so soon as the pressure of expansion on the rear face of the piston equals the pressure of the compression on the front side of the piston, the ball 67 will drop, which will allow a small flow of the compressed medium through the piston, which issuing at the outer end of the plug 65 will be ignited by the expanding burning charge acting on the rear face of the piston. This flame will continue to burn until the piston G passes through one of the valves. This will now subject the rear face of the piston to this compressed charge, and the flame will thereupon ignite and explode the charge. The spherical check-valve will now prevent the pressure from flowing through the piston into the unignited combustible charge, which is being compressed in front thereof as the piston moves through the next compartment. Thus the movement of the piston will carry the igniting flame successively past the ports of the chamber into which the charges are compressed, and will ignite them in continuous sequence at any speed at which the motor may be run. This automatic ignition will continue so long as the supply of combustible expansive medium in front of the piston is maintained, even under varying mixtures and regardless of atmospheric conditions outside of the motor.

While the previous described ignition device is the preferred form, other devices may be used. For example, a knob 68 of refractory material, as carbon, may be secured to the rear face of the active piston, as shown in Fig. 10. After the motor has run a short time, this knob will reach the temperature of incandescence, and will serve the purpose of a continuous ignition device.

The piston G may be made to carry suitable electric connections, as 69 and 70, which may be extended to form a sparking device, as shown in Fig. 11, or to carry a filament 71, which will become incandescent by the passage of an electric current, as shown in Fig. 12. The member F may carry suitable rings 72, bearing against which are brushes 73, which will conduct a current of electricity through said wires. By either of these devices an electric ignition device will be provided on the rear or pressure face of the piston.

The operation of the complete motor as thus described is substantially as follows:— The motor is started by giving the same a turn or a few turns, and by using the initial ignition device previously described. Suppose that the motor is started so that the piston carrying member F is turned in the direction indicated by the arrow in Fig. 3, and suppose that we consider the action which takes place in the compartment between the upper valve J and the left hand valve $J^2$. As shown, the charging piston H has just moved through this compartment, and the front face thereof has swept out or completely exhausted all products of combustion remaining therein, and the rear face of the piston has drawn a fresh mixed charge of gas and air in through the inlet port 35. This charge now remains momentarily in this compartment, and exercises the cooling effect before mentioned, until the propelling piston G passes through the left-hand valve $J^2$. As the propelling piston now operates in the compartment under consideration, the front face thereof will push and compress the charge previously drawn into this compartment in advance of the same, the propelling piston being urged along its travel by the explosion and expansion of the charge contained in the compression chamber arranged in connection with the valve $J^2$ at its rear. As the propelling piston reaches the valve J toward which it is moving, the compressed charge, which was originally in the compartment we are considering, will have been entirely compressed into the said valve J and the compression chamber arranged in connection therewith, and as the propelling piston passes this valve J, the compressed charge will now be placed in position behind the propelling piston, and will then be exposed to the action of the ignition device carried by the rear face thereof and exploded. The explosion and expansion of this charge will now urge the propelling piston through the compartment formed between the upper valve J and the right-hand valve J'. Thus the charge originally drawn into the compartment between valves J² and J is compressed into the compression chamber arranged in connection with the valve J, and exploded and expanded in the adjoining compartment between valves J and J'. Just so soon as the propelling piston passes the valve J', the exhaust port L cut in the flange F' will come into position to open the compartment between valves J and J', and this compartment will be completely exhausted by the travel of the charging piston H therethrough. The exhaust port L is given a long lead, so that the exhaust will commence the instant the propelling piston passes out of the compartment, so that no more heat will be absorbed by the walls of the compartment than is absolutely necessary. Thus it will be seen that each piston face continuously performs the same function successively through the three compartments, and that the four operations necessary to the cycle are performed continuously and in proper relative successive sequence in each compartment. By this arrangement a very simple, efficient and capable motor is produced which can be run very economically, because any desired length of expansive movement can be obtained.

The flange F' is surrounded by an exhaust casing M, which is preferably set to cover the joint between the flange F' and the member C so that any leakage between the two members will pass therein. The products of combustion passing out through the exhaust port L will pass into this exhaust casing M, and may be led away by an exhaust pipe N. It will also be noted that the previously described motor is one that can be efficiently packed and kept tight.

The preferred arrangement of valves is that shown in the previously described figures. That is, it is preferred to arrange the valves at right angles to the shaft of the motor, so that the pressure of explosion and expansion comes directly upon the opposed spherical portions of the two members without any tendency to laterally displace these parts. If, however, it is desired to arrange the valves parallel with the shaft of the motor, the same can be done by arranging the parts as shown in Fig. 14, and by using spur-gears 74 and 75 in place of bevel-gears to actuate the valves, and by arranging the spur-gear 75 on the shaft to engage a thrust-bearing 75¹, arranged on the end of the member C. The other parts will be arranged substantially as shown, and a detail description thereof is not thought necessary.

Instead of having the member which carries the pistons form the rotating member, it is obvious that the member which carries the valves may be made the rotating member, the piston member being anchored to the frame; or it is obvious that a motor may be made according to my invention in which either part at will may be the rotating part, with the advantage thereby following that the motor can be run in either direction. Such construction is shown in Fig. 15. In this figure, substantially the same arrangement as shown in Fig. 2 is employed, except that the parts are modified to obtain the above described result. The members C and F in this modification are both loosely arranged on the shaft D. Clutch teeth 76 are formed on the end of the hub of the member C, and similar clutch-teeth 77 are formed on a collar 78 secured to the member F. The right hand end of the shaft is bored out, and fitting in the same is a rod 79 which carries a key 80, which can be moved to engage either set of clutch-teeth. The shaft D is suitably cut away, so that the key can be extended up between the clutch faces for this purpose. By this arrangement, when the key is moved to engage either set of clutch faces it will lock the particular member carrying such clutch teeth to the shaft. The members C and F also are provided on their outer adjoining surfaces with clutch teeth 81 and 82, as shown. A rod 83 is arranged to slide in a bearing B² which is used at the right hand end of this form of motor. This rod is also fitted in the base A of the machine. This rod carries two projections 84 and 85 to engage the clutch teeth 81 and 82. The rod also connects to the rod 79 by means of suitable collars 86 and 87. The rod 83 is arranged to be operated by a suitable handle 88. By this arrangement, when the handle 88 is moved down, the key 80 will be moved to the right, and the member F will thereby be locked to the shaft D. At the same time the rod 83 will be moved up and the projection 85 will engage the clutch-teeth 81 and lock the member C to the frame. By this arrangement the piston carrying member C then becomes the stationary part. By moving the handle 88 in the reverse direction, the member F is locked to the base, and the member C then becomes the rotating part. In this arrangement the electrical connections to the initial igniter are carried through a ring 89 which is insulated and mounted on the collar 78, and a brush 90 is arranged to carry the current to this ring.

This construction is adopted, because when the member F is connected to become the rotating part, it is necessary to allow the initial ignition device a connection of this character. In this modification, the supply of the actuating medium is taken through the left-hand end of the shaft D, and the governor is arranged in the pulley E, and the mixed supply of air and gas is taken through a pipe 91 and a hollow portion 92 in the shaft D to a groove 93 cut in the member C, the inlet passage being connected to this groove 93. Suitable packing may be arranged between the shaft and the member C at each side of this groove 93. In this way a supply is provided for no matter which member, C or F is the rotating member. In this way it is possible to make a motor that can be run in either direction, because when the member F is used as the rotating member, the torque will act in one direction, and when the member C is to be used as the rotating member, the torque will act in the other direction. By placing the governor in the pulley as shown, the governor will act properly, no matter which way the motor is run. By this arrangement the pulley E can be rotated in either direction as desired, and a reversible motor is provided. It is therefore within the scope of my invention to make either the piston carrying member or the valve carrying member the rotating part.

It will be noticed that the ports are fixed with respect to the pistons; that is, that the inlet port 35 and the exhaust port L always occupy the same position relatively to the pistons, no matter whether the pistons rotate or stand stationary in operation.

In the particular illustration shown, two pistons are used in connection with three compartments. This is the preferred arrangement, as it gives a long expansion movement owing to the length of the compartments. It is, of course, within my invention to multiply the number of pistons, so that any number may be used. Any number of compartments which is equal to or greater than the number of pistons can be used. Thus with four pistons, six compartments can be used, etc.

This construction of motor may be adapted to burn oil or other volatile and inflammable substance by the use of suitable vaporizing attachments adapted to thoroughly commingle the fuel and the air necessary for combustion within the motor. When fuel of slow inflammability is used a refractory lining of graphite or other suitable material may be placed in the compression chambers controlled by each valve, or upon the back of the propelling piston, as previously described, and as shown in Fig. 10, the graphite or other refractory lining attaining a temperature of incandescence, due to the heat of combustion, which will ignite the charges of mingled fluid and air when they are sufficiently compressed, obviating the necessity of other igniting devices after the engine is started.

Many other arrangements and modifications can be devised without departing from the broad scope of my invention as expressed in the claims.

Having thus fully described my invention, what I claim and desire to secure by Letters Patent is:—

1. In a rotary engine, the combination of an element having a single continuous annular groove or chamber, pistons fitting therein, valves dividing said groove into a number of compartments, an igniting device and an element carrying said pistons and having ports constantly communicating with said groove constituting means whereby the four functions of introduction, compression, explosion and expansion, and exhaust are timed to take place in order in said groove.

2. In a rotary engine, the combination of a stationary element having a single continuous groove or chamber, valves dividing said groove into a number of compartments, an igniting device, a rotatable element having ports constantly communicating with said groove and constituting means whereby the four functions of introduction, compression, explosion and expansion, and exhaust are timed to take place progressively around said groove, and pistons carried by said rotary element and fitting in the groove.

3. In a rotary engine, the combination of an annular groove or chamber, two pistons fitting therein, valves dividing said groove into compartments, and means whereby in front of each one of the four piston-faces will be continuously performed one of the four functions of introduction, compression, explosion and expansion, and exhaust necessary to the complete operation.

4. In a rotary engine, the combination of an annular groove or chamber, two pistons fitting therein, valves dividing said groove into compartments, and an element carrying the pistons and having means whereby each face of each piston is continuously employed in successively performing the same function or division of operation, and whereby the four functions or divisions of operation of introduction, compression, explosion and expansion, and exhaust constituting a complete operation take place successively in proper order in each compartment.

5. In a rotary engine, the combination of an annular groove, two pistons fitting therein, valves dividing the groove into a number of compartments and a rotary element having means coöperating therewith whereby one piston will continuously receive the impact of explosion and expansion on its rear face, and perform the function of compression with its front face, and the other piston will continuously perform the function of exhaust with its front face, and the function of introduction with its rear face.

6. In a rotary engine, the combination of an annular groove, two diametrically arranged pistons fitting therein, valves dividing the groove into a number of compartments, and a rotary element having means coöperating therewith whereby one piston will continuously receive the impact of explosion and expansion on its rear face, and perform the function of compression with its front face, and the other piston will continuously perform the function of exhaust with its front face, and the function of introduction with its rear face.

7. In a rotary engine, the combination of an annular groove, a propelling piston and a charging piston fitting therein, valves dividing the groove into a number of compartments, and means whereby each piston-face will continuously perform one of the four functions of introduction, compression, explosion and expansion, and exhaust necessary to the complete operation in each compartment.

8. In a rotary engine, the combination of an element having a single continuous annular groove or chamber, two pistons fitting therein, three valves dividing said groove into three compartments, an igniting device and an element carrying said pistons and having ports constantly communicating with said groove and constituting means whereby the four functions of introduction, compression, explosion and expansion, and exhaust necessary to the complete operation will be timed to take place in each compartment in proper order.

9. In a rotary engine, the combination of an element having a single continuous annular groove or chamber, two pistons fitting therein, three valves dividing said groove into three compartments, an element carrying said pistons and having ports constantly communicating with said groove and constituting means whereby the four functions of introduction, compression, explosion and expansion, and exhaust necessary to the complete operation will be timed to take place in each compartment in proper order, and means whereby the fresh cool charge will have a momentary dwell in each compartment before compression.

10. In a rotary engine, the combination of an element having a single continuous annular groove or chamber, pistons fitting therein, valves dividing said groove in a number of compartments greater than the number of pistons, an element carrying said pistons and having ports constantly communicating with said groove and constituting means whereby the four functions of introduction, compression, explosion and expansion, and exhaust necessary to the complete operation will be timed to be performed in each of said compartments and whereby there will be a momentary dwell of the fresh cool charge in each compartment to obtain a cooling effect.

11. In a rotary engine, the combination of an element having a single continuous annular groove or chamber, two pistons fitting therein, three valves dividing said groove into three compartments, and an element carrying said pistons and having ports constantly communicating with said groove and constituting means whereby the four functions of introduction, compression, explosion and expansion, and exhaust necessary to the complete operation will be timed to take place in each compartment in proper order, one of said ports being an exhaust port which has considerable lead whereby the exhaust will take place without substantial dwell of the exploded and expanded charge.

12. In a rotary engine, the combination of an element having a single continuous annular groove or chamber, pistons fitting therein, valves dividing said groove into a number of compartments, and an element carrying said pistons and having means whereby the four functions of introduction, compression, explosion and expansion, and exhaust necessary to the complete operation will be timed to take place in proper order in each compartment and whereby the exhaust after explosion and expansion will take place without dwell of the spent charge but with a momentary dwell of the fresh, cool, unexploded charge in each compartment.

13. In a rotary engine, the combination of an element having a single continuous annular groove or chamber, two pistons fitting therein, three valves dividing said groove into three compartments, an element carrying said pistons and having means whereby the four functions of introduction, compression, explosion and expansion, and exhaust necessary to the complete operation will be timed to take place in each compartment in proper order, one of said ports being an exhaust port having a lead, whereby the exhaust of the exploded and expanded charge will take place without dwell of the spent charge, and whereby there will be a momentary dwell of the fresh, cool, unexploded charge in each compartment to affect a cool action.

14. In a rotary engine, the combination of an element having a single continuous annular groove or chamber, pistons fitting therein, valves dividing the groove into a number of compartments, each valve having a compression chamber arranged in connection therewith, and an element carrying said pistons and having ports constantly communicating with said groove and constituting means whereby the four functions of introduction, compression, explosion and expansion, and exhaust necessary to the complete operation will be timed to take place continuously in proper order in each compartment.

15. In a rotary engine, the combination of an element having a single continuous annular groove, two pistons fitting therein, three valves for dividing the groove into three compartments, each valve having a compression chamber arranged in connection therewith, and an element carrying said pistons and having ports constantly communicating with said groove and constituting means whereby the four functions of introduction, compression, explosion and exhaust necessary to the complete operation will be timed to take place continuously in proper order in each of said compartments.

16. In a rotary engine, the combination of an annular groove, pistons fitting therein, valves dividing said groove into a number of compartments, a compression chamber arranged in connection with each valve, and means for adjusting the size of each of said chambers.

17. In a rotary engine, the combination of a member having an annular groove, and valves dividing said groove into a number of compartments, another member carrying pistons fitting in said groove, and inlet and exhaust ports carried by the piston carrying member.

18. In a rotary engine, the combination of a single continuous annular groove, pistons fitting therein, valves dividing the groove into a number of compartments, and a rotary element having means coöperating with said groove, piston, and valve, whereby the four functions of introduction, compression, explosion and expansion, and exhaust necessary to the complete operation will be continuously performed in proper order in each of said compartments, and each charge will be introduced and compressed in one compartment, and exploded, expanded in, and exhausted from the adjoining compartment in advance of the compartment in which the charge was introduced.

19. In a rotary engine, the combination of an annular groove, two pistons fitting therein, three valves dividing the groove into three compartments, and means connected with said pistons whereby the four functions of introduction, compression, explosion and expansion, and exhaust necessary to the complete operation will be timed to take place continuously in proper order in each compartment, and each fresh charge will be introduced into one compartment, compressed therein, and exploded, expanded in, and exhausted from the adjoining compartment in advance of the compartment in which the charge was introduced.

20. In a rotary engine, the combination of a member having an annular groove, valves dividing the groove into a number of compartments, another member carrying a propelling and a charging piston fitting in said groove, and an inlet at the rear of the charging piston.

21. In a rotary engine, the combination of a member having a spherical bearing surface, an annular groove formed therein, valves dividing said groove into a number of compartments, another member, having a spherical surface fitting on the first named spherical surface, and carrying a number of pistons fitting in said groove, the valves bearing on this spherical surface, and suitable ports.

22. In a rotary engine, the combination of a valve carrying member having a spherical surface, an annular groove cut therein, valves arranged radially to said spherical surface, a piston-carrying member having a spherical surface engaging the first named spherical surface, and against which the valves bear, and suitable ports.

23. In a rotary engine, the combination of a valve-carrying member having a spherical surface, an annular groove formed therein, rotary valves arranged in said member, a piston-carrying member having a spherical surface engaging the first named spherical surface and carrying pistons fitting in said groove, said valves having their ends bearing on the spherical surface of the piston carrying member.

24. In a rotary engine, the combination of a valve-carrying member having a spherical surface, an annular groove formed therein, valves dividing said groove into a number of compartments, a piston carrying member made in parts and having a spherical surface engaging the spherical surface of the valve carrying member and carrying a number of pistons fitting in said groove, and suitable ports.

25. In a rotary engine, the combination of a valve-carrying member having a spherical surface, an annular groove formed therein, a number of valves fitted in said spherical surface, and a piston carrying member having a surface engaging said spherical surface and carrying a number of pistons fitted in said groove, the said valves having packings at their ends where they bear on the surface of the piston-carrying member.

26. In a rotary engine, the combination of an annular groove or chamber, a piston fitted therein to receive the impact of explosion on its rear face, and carrying an ignition device behind its rear face.

27. In a rotary engine, the combination of an annular groove or chamber, valves dividing said chamber into a number of compartments, and a piston fitted therein and subjected to a fresh charge every time it passes a valve, and carrying an ignition device on its rear face.

28. In a rotary engine, the combination of an annular groove or chamber, valves dividing said chamber into a number of compartments, a propelling piston fitting in said groove and performing the function of compression with its front face, and receiving the impact of explosion on its rear face, and having a passage therethrough to maintain a small flame on its rear face.

29. In a rotary engine, the combination of an annular groove, valves dividing the same into a number of compartments, a propelling piston performing the function of compression with its front face, and receiving the impact of explosion on its rear face, and having a small hole bored therethrough to maintain a small flame in proper position for ignition purposes, and a check-valve arranged in said passage.

30. In a rotary engine, the combination of an annular groove, valves dividing said groove into a number of compartments, a propelling piston performing the function of compression with its front face, and receiving the impact of explosion on its rear face, and having a passage bored therethrough, a check-valve arranged in said passage, and a by-pass to prevent the check-valve from stopping the flow when the check valve is open.

31. In a rotary engine, the combination of an annular groove or chamber, a piston fitting therein, performing the function of compression with its front face, and receiving the impact of explosion in its rear face, a counter-bored passage extending through the same, a hollow screw-plug tapped into said passage, and a spherical check-valve arranged at the end of said plug.

32. In a rotary engine, the combination of an annular groove or chamber, a propelling piston fitting therein, and performing the function of compression with its front face, and receiving the impact of explosion on its rear face, a counter-bored passage extending through said piston, a hollow screw-plug threaded therein, and having a by-pass, and a spherical check-valve arranged at the end of said screw-plug.

33. In a rotary engine, the combination of an annular groove or chamber, valves dividing said chamber into a number of compartments, compression chambers arranged in connection with said valves, a propelling piston, and an ignition device carried by the rear face of said piston.

34. In a rotary engine, the combination of an annular groove or chamber, valves dividing the chamber into a number of compartments, compression chambers arranged in connection with each of said valves, a propelling piston arranged to receive the effect of a fresh charge every time it passes a valve, and carrying a continuous ignition device on its rear face.

35. In a rotary engine, the combination of a single continuous groove or chamber, valves dividing the same into a number of compartments, pistons fitting therein, compression chambers arranged in connection with said valves, a service igniting device, and an initial ignition device arranged in one of said chambers to start the motor in operation, and connections so that the same may be thrown out of operation after the motor has been started.

36. In a rotary engine, the combination of a single continuous annular groove or chamber, valves for dividing the same into a number of compartments, pistons fitting therein, compression chambers arranged in connection with said valves, an initial ignition device arranged in one of said chambers to start the motor, and a continuous ignition device carried by one of said pistons.

37. In a rotary engine, the combination of a valve-carrying member having a single continuous groove, and valves dividing said groove into a number of compartments, a piston-carrying member having a flange fitting over the other flange, and carrying a propelling piston and a charging piston having shanks projecting through said flange and held in place by keys.

38. In a rotary engine, the combination of a valve-carrying member having a single continuous annular groove, valves dividing said groove into a number of compartments, said valves being offset relatively to the groove, and a piston-carrying member carrying a propelling piston and a charging piston fitting in said groove.

39. In a rotary engine, the combination of a valve-carrying member having an annular groove, and valves dividing said groove into a number of compartments, a piston-carrying member having a flange fitting on the valve-carrying member and carrying pistons fitting in said groove, and an exhaust port cut through said flange.

40. In a rotary engine, the combination of a valve-carrying member having an annular groove, and a number of valves dividing said groove into a number of compartments, a piston carrying member having a flange fitting on the valve-carrying member and carrying a number of pistons fitted in said groove, an exhaust port cut in said flange, and an exhaust-casing surrounding said flange.

41. In a rotary engine, the combination of a valve-carrying member having an annular groove, and a number of valves dividing said groove into a number of compartments, a piston-carrying member fitted on the valve-carrying member and carrying a number of pistons fitting in said groove, an inlet passage in said piston-carrying member, a shaft on which the piston-carrying member is mounted, and an inlet passage extending through said shaft.

42. In a rotary engine, the combination of a shaft, a valve-carrying member, and a piston-carrying member mounted thereon, connections whereby either member can be made the rotating part, a pulley or wheel mounted on said shaft, a governor controlling the supply of the actuating medium arranged in said pulley or wheel, and a connection for leading the actuating medium from said governor into the engine.

43. In a rotary engine, the combination of the shaft, a piston carrying member, and a valve-carrying member mounted on the shaft, an inlet passage extending through said shaft, and a channel cut in the piston carrying member surrounding the outlet of said passage, and connections whereby either member may be locked to the shaft.

In testimony whereof I have hereunto set my hand, in the presence of two subscribing witnesses.

JAMES WALLACE TYGARD.

Witnesses:
SEYMOUR CONOVER,
H. A. WISE WOOD.